Sept. 22, 1970               E. PUTIN               3,529,331
MACHINE FOR ROTATING AND CUTTING LENGTHS OF CLAY
FOR THE PRODUCTION OF BRICKS Filed Nov. 7, 1967                                      4 Sheets-Sheet 1

INVENTOR:
E. Putin
By Richards & Geier
ATTORNEYS

INVENTOR:
E. Putin

INVENTOR:
E. Putin
BY
Richards & Geier
ATTORNEYS

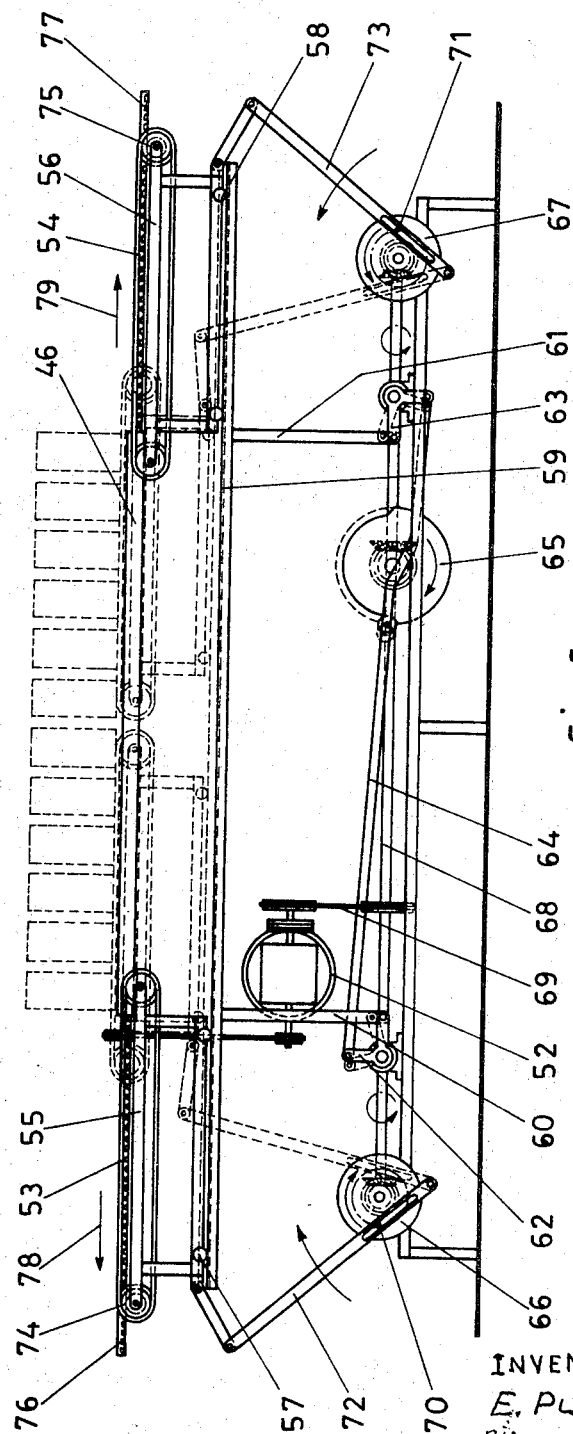

United States Patent Office 3,529,331
Patented Sept. 22, 1970

3,529,331
MACHINE FOR ROTATING AND CUTTING LENGTHS OF CLAY FOR THE PRODUCTION OF BRICKS
Enrico Putin, Via P. Trevisan 2, Villaveria, Vicenza, Italy
Filed Nov. 7, 1967, Ser. No. 681,245
Claims priority, application Italy, Nov. 26, 1966, 66,623/66
Int. Cl. B28b *11/14;* B65g *47/24*
U.S. Cl. 25—107                            4 Claims

ABSTRACT OF THE DISCLOSURE

Lengths of clay move in spaced relationship to a device which rotates them to the extent of 90 degrees and moves them to a cutting device provided with cutters which cut them into several pieces which are then removed by rollers provided with spacers.

---

Figure 1:
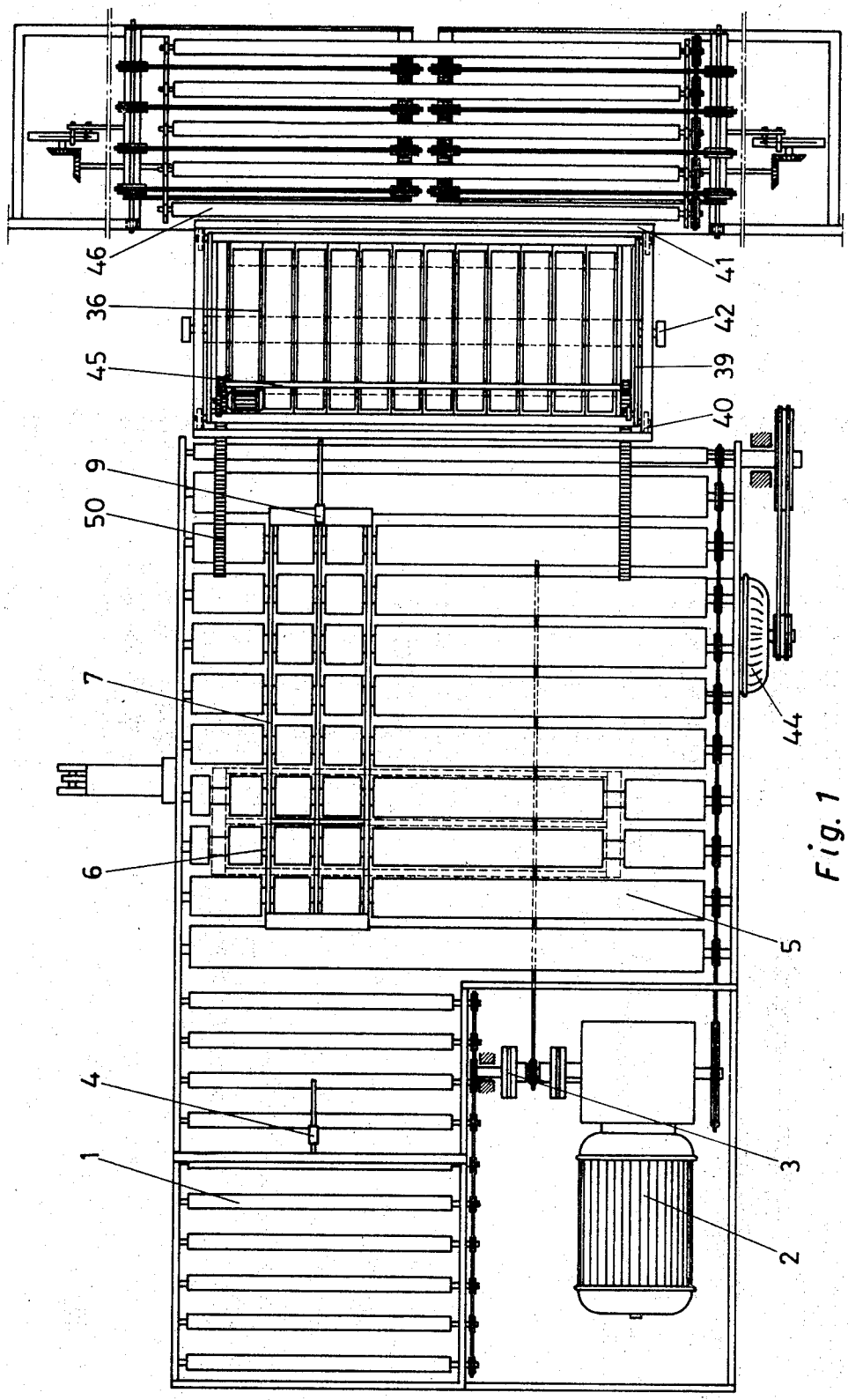

The present invention relates to a machine for rotating and cutting lengths of clay for the production of bricks.

As is well known, the progressing automation of the brick making industry has resulted in the construction of many types of installations for cutting the length of clay as it moves, a feature which greatly complicates the production thereof, giving rise in certain cases to cutting irregularities.

The loading of the clay bricks for conveying them to the drying chamber requires the pre-arrangement of the bricks in parallel rows, a feature which inevitably complicates the associate apparatus, limiting the production of the lengths per unit of time.

An object of the present invention is to provide a machine by means of which a length of clay coming from an extruding machine is passed through a cutter and a spacer, and is caused to rotate through 90° and advance until the pieces pass under a multiple cutter which cuts them transversely to their longitudinal axes for the purpose of forming clay bricks which then pass to a spacing device which separates them from each other. They are then caused to advance onto a conveyor of known type for transferring to various processing stations.

Other objects of the present invention will become apparent in the course of the following specification.

In the course of the accomplishment of the objectives of the present invention the length of clay issuing from the extruding machine, previously cut into lengths, each length having the shape of an entire row of bricks, is loaded upon a series of rotating rollers which are rapidly rotated by a motor having a friction drive, whereby a length of clay, in advancing, touches a feeler disposed in the initial path of the series of rollers. The length, thus separated from the succeeding length, is carried onto the directing section of the apparatus.

This section comprises a series of rotatable rollers, set in rotation by a motor, some of which rollers are grooved for the purpose of receiving a frame which, in a position of rest, is on a level lower than the plane tangent to the upper plane of the rollers, being slightly raised, and the length of clay is rotated through 90°, being deposited again on the rollers.

The length so rotated is advanced by the rollers to a multiple cutter with a fixed supporting plane, where it is cut into the number of bricks forming a line on the level of the frame or on the conveyor line, for loading the drying chamber.

The bricks cut by this cutter are carried on a spacer device, comprising rotatable rollers rotated at intervals by a motor, between which there are inserted at a predetermined interval displaceable belts carried on pulleys and rotated so as to travel in the opposed direction relatively to the direction in which they are inserted between the rollers.

The belts are raised above the level of the rollers, lifting the bricks for a necessary time and causing mutual separation thereof at uniform distances.

Then the belts are lowered, turning and depositing the bricks on the rollers which advance them, separated by the device, on successive conveyor levels for the loading of the frame or for feeding to the dryers.

Figure 2:
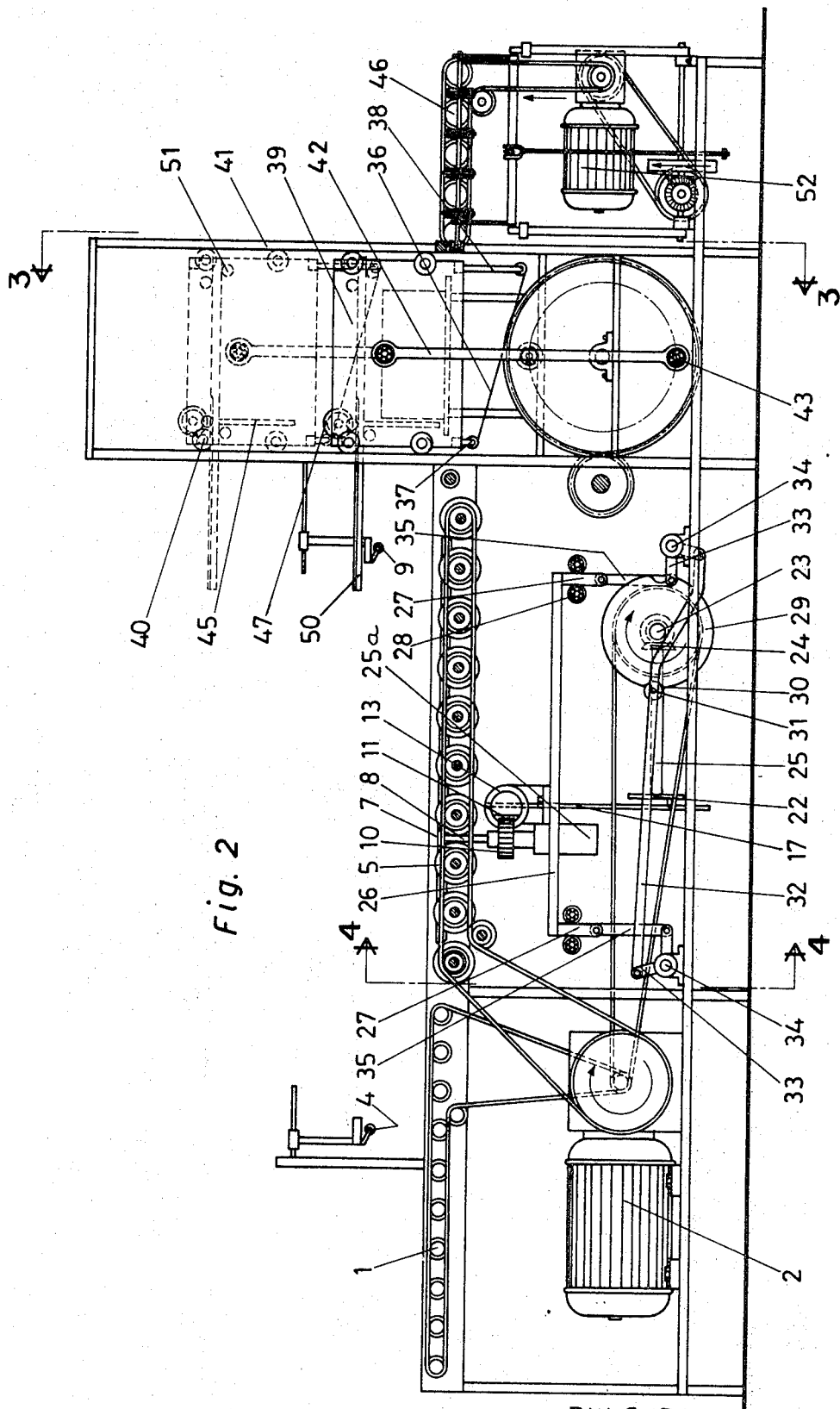
Figure 3:
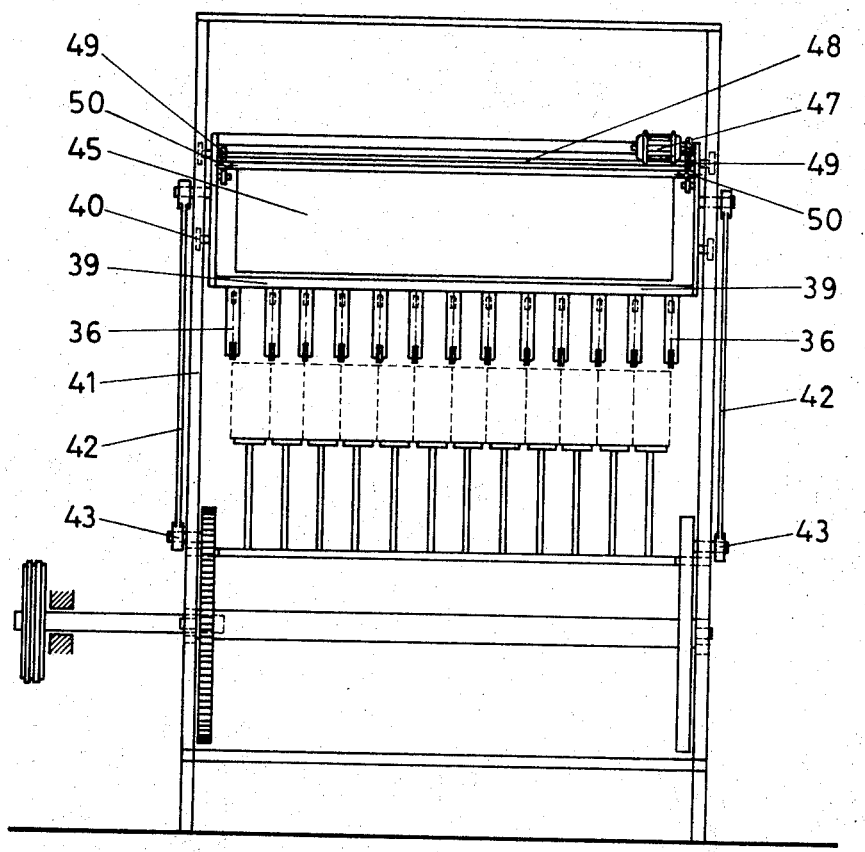
Figure 4:
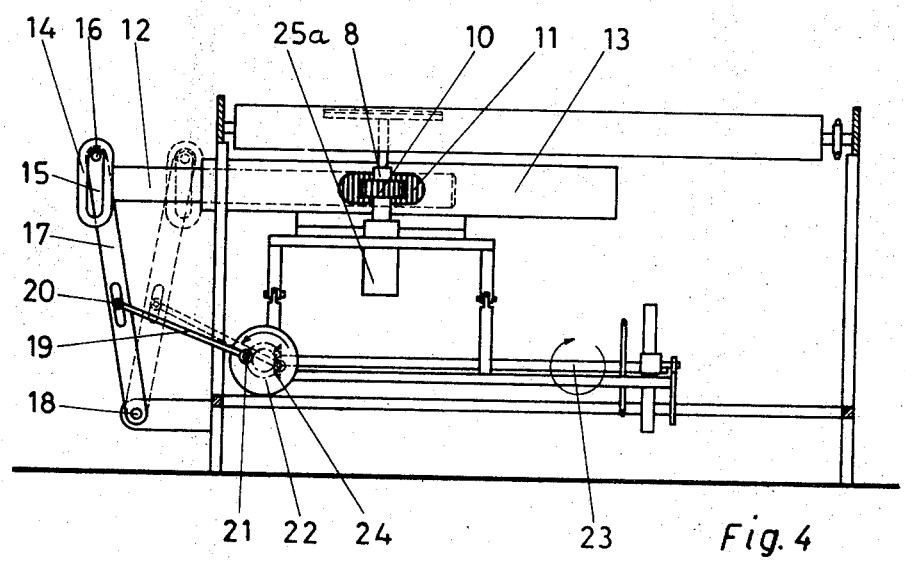

The invention will appear more clearly from the following detailed description when taken in connection with the accompanying drawings in which:

FIG. 1 is a plan view of the apparatus;
FIG. 2 is a side view thereof;
FIG. 3 is a vertical section of the apparatus taken on the line A—A of FIG. 2;
FIG. 4 is a section of the apparatus taken on the line B—B of FIG. 2;
FIG. 5 is a front view of the apparatus viewed in the loading direction.

The apparatus according to the invention comprises a first series of rollers 1 (FIG. 1) which rotate at high speed, controlled by the electric motor 2 by way of the friction drive 3 when a length of clay issuing from an extruding machine is cut by a cutter and comes into contact with the feeler 4. The rollers 1 separate the lengths of clay from each other, causing them to advance onto the directing section of the apparatus.

This directing section comprises rollers 5 provided with grooves 6, within which the bars of a frame 7 engage, said frame being secured to a vertical shaft 8 (FIG. 2) which at the moment in which the length of clay comes into contact with the feeler 9, proceeds to raise the frame 7 and to rotate it until it is disposed in the position indicated by the broken line shown in FIG. 1.

The shaft 8 is rotated by a gear 10 which meshes with a rack 11 (FIG. 4) formed on a bar 12, displaceable within a fixed tube or guide 13. The latter has an elongated opening, through which the gear 10 meshes with the rack 11. The free end of the bar 12 is provided with a head 14 in which is formed a slot 15 in which a spindle 16 engages, carried by a lever 17, the latter being pivoted at 18 on a fixed point of the frame structure, while a connecting rod 19 connects a spindle 20, connected to the lever 17, with a crank 21 rotatable along with a disc 22. The latter is rotated by a shaft 23, by way of a pair of bevel gears 24 which are connected to a shaft 25 (FIG. 2) on which is keyed the disc 22.

The shaft 8 is carried by a support 25a connected to a frame 26 which is substantially rectangular and provided with vertical rods 27 by means of which it is guided on rollers 28.

A disc 29, mounted on the shaft 23, receives in its cavities 30 which are diametrically opposed, a roller 31 connected to a lever 32 which controls by means of bell crank levers 33, pivoted at 34, the vertical movement of connecting rods 35 attached to shafts 27 connected to the frame 26.

It is obvious that when the disc 29 begins its movement of rotation in the direction shown by the arrow in FIG. 2, from the resting position shown in the drawings and through a half rotation, the frame 26 and the shaft 8 with the frame 7 mounted thereon are raised by an amount sufficient to permit rotation of the shaft, returning to a level lower than that of the rollers 5 at the end of such rotation.

When the length of clay is advanced in its new direction by rotation of the rollers 5, until it reaches the cutter, another rotation through half a turn of the disc 29 causes the raising of the frame 7 and its rotation through 90° in a direction opposite to the foregoing one until it is brought to the position of rest shown in full lines in FIG. 1.

A time switch, suitably adjusted, starts this movement of rotation for returning the frame 7 to the position of rest.

The rollers 5 which rotate continuously, advance the length of clay in the new direction resulting from the rotation of the frame 7 until it is brought onto the cutter.

The cutter comprises multiple cutting blades 36 (FIG. 2) preferably inclined, in order to avoid deformation of the mass of clay during the cutting; the blades are carried by pairs of shafts 37 and 38 provided with pulleys at the ends between which the cutting blades are kept taut.

The shafts 37 and 38 are mounted on a frame 39 which is movable vertically by guide pulleys 40 attached to vertical uprights 41.

The vertical movement of the cutting members is controlled by connecting rods 42, the cranks 43 of which are connected to a motor 44 by a pair of gears.

A push member 45, horizontally displaceable on guides carried by the displaceable frame 39 which supports the cutting members 36, pushes the cut pieces of clay into the plane of the rollers 46.

The movement of the push member 45 is effected by the electric motor 47 (FIG. 3) which controls through a gear transmission the rotation of a shaft 48, the two end gears 49 of which mesh with the rack connected to the push member 45. The unit consisting of the racks of the push member is guided by rollers 51 (FIG. 2) rotatable on pivots fixed to the displaceable frame 39.

The movement of the push member 45 must obviously be synchronized with that of the blades 36, to make certain that the push member 45 begins its reciprocating movement after the blades 36 have completed their movement cutting the length of clay, and reaching the position shown in full lines in FIG. 2.

The rollers 46 are rotated at predetermined intervals by the electric motor 52, through suitable interposed mechanical transmissions and friction gears.

Located in the spaces between the rollers are rotating belts 53 and 54 (FIG. 5) supported by pulleys carried by displaceable carriages 55 and 56 which run, supported by the rollers 57 and 58, on the frame 59, which is vertically displaceable.

The vertical uprights 60 and 61 connected to the frame 59 are raised by the rotation of the bell crank levers 62 and 63 controlled by the displacement of the bar 64, caused by the rotating cam 65. This cam is rotated, together with the discs 66 and 67, in the direction indicated by the arrows in FIG. 5, by a longitudinal shaft 68 connected through a transmission gear 69 to the electric motor 52.

By means of studs 70 and 71 secured thereto, the discs 66 and 67 effect the angular displacement of the levers 72 and 73 which cause the horizontal movements of the carriages 55 and 56 on the frame 59.

These movements of penetration by the belts 53 and 54 between the rollers 46 are effected simultaneously with the raising of the frame 59, a feature which thereby involves the raising of the pieces of clay resting on the rollers 46.

The toothed wheels 74 and 75, pivoted on the carriages 55 and 56, mesh during this movement of penetration with the racks 76 and 77, fixed to the frame 59. The toothed wheels 74 and 75 are rotated by belts 53 and 54 connected to the driving pulleys.

It is apparent that during the movement of penetration between the rollers 46, the belts are displaced in directions indicated by the arrows 78 and 79 at a speed greater than that of the penetration of the carriages 55 and 56 between the rollers 46, causing a corresponding relative displacement of the pieces of clay located on these rollers. They are thus separated from each other by a uniform amount. At the end of the movement of penetration, belts 53 and 54 are lowered, together with the frame 59, returning to the position of rest shown in full lines in FIG. 5.

The rollers 46 thereafter resume their rotation, feeding the cut and spaced pieces of clay towards the succeeding devices.

It is apparent that the above described example has been given by way of exemplification only and that the details of construction of the apparatus such as the mechanical control of the various movements, the friction coupling gears, the time switches which determine the succession of movements, the electric circuits for feeding the various control devices of the apparatus, as well as other parts, may be varied without departing from the scope of the present invention.

What is claimed is:

1. In a machine for making bricks, a device for feeding elongated lengths of clay in a direction parallel to their lengths, a device for receiving said lengths of clay and rotating them to the extent of 90 degrees, a device for advancing the rotated lengths of clay in a direction perpendicular to their lengths, a cutting device receiving the rotated lengths of clay and having a plurality of reciprocable cutting blades transversely cutting said lengths of clay into pieces having the size of bricks, a series of transfer rollers, means for advancing the cut pieces of clay in succession to said rollers, and spacer means adjacent said rollers for causing mutual uniform separation of said cut pieces on said rollers.

2. A machine in accordance with claim 1, wherein said means for advancing comprises a push member adapted to engage a cut piece of clay, and means reciprocating said push member in the direction toward and away from said rollers.

3. A machine for rotating and cutting lengths of clay used in the production of bricks, said machine comprising a device for rotating lengths of clay to the extent of 90 degrees, said device comprising a series of partly grooved rotatable rollers, a frame having bars extending through said grooves, a vertical shaft carrying said frame, and means actuating said shaft for raising and rotating the lengths of clay to the extent of 90 degrees and then depositing them in a new direction upon said rotatable rollers; means for advancing the lengths of clay in spaced relationship to said device, a cutter, means for advancing said lengths of clay in succession in the new direction to said cutter, said cutter having a plurality of cutting blades for transversely cutting the lengths of clay, a series of transfer rollers, means for advancing the cut pieces of clay in succession to said rollers, and spacer means adjacent said rollers for causing mutual uniform separation of said cut pieces on said rollers.

4. A machine for rotating and cutting lengths of clay used in the production of bricks, said machine comprising a device for rotating lengths of clay to the extent of 90 degrees, means for advancing the lengths of clay in spaced relationship to said device, a cutter, means for advancing said lengths of clay in succession in the new direction to said cutter, said cutter having a plurality of cutting blades for transversely cutting the lengths of clay, a series of spaced transfer rollers, means for advancing the cut pieces of clay in succession to said rollers, and spacers adjacent said rollers, said spacers comprising rotating belts, carriages carrying said belts, and a vertically displaceable frame, said carriages adapted for movement upon said frame, said belts penetrating into the spaces between said rollers and adapted for slightly rising and rotating so as to be displaceable at the top in directions opposed to those of their movements of penetration and at a greater speed to raise the pieces of clay resting on the rollers and to displace them outwardly so as to space them from each other by a constant amount, whereupon said belts are adapted to descend to permit the transfer rollers to transfer the spaced pieces of clay.

References Cited

UNITED STATES PATENTS

| | | | |
|---|---|---|---|
| 943,541 | 12/1909 | Hasselback | 25—107 |
| 2,965,213 | 12/1960 | Kugler | 198—105 X |
| 3,035,469 | 5/1962 | Schmunk et al. | 25—107 X |
| 3,044,216 | 7/1962 | Billinger | 225—96.5 |

ROBERT D. BALDWIN, Primary Examiner

U.S. Cl. X.R.

25—113; 83—418; 198—33, 34